US012647353B2

(12) United States Patent
Mirza et al.

(10) Patent No.: US 12,647,353 B2
(45) Date of Patent: Jun. 2, 2026

(54) TECHNIQUES FOR OPTIMIZING IMS SERVICE ROUTING

(71) Applicant: T-Mobile USA, Inc., Bellevue, WA (US)

(72) Inventors: Khurram Ahmad Mirza, Bellevue, WA (US); Madhuri Kotta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 88 days.

(21) Appl. No.: 18/830,348

(22) Filed: Sep. 10, 2024

(65) Prior Publication Data

US 2026/0074990 A1     Mar. 12, 2026

(51) Int. Cl.
*H04L 45/302* (2022.01)
*H04L 65/1016* (2022.01)
*H04L 65/1069* (2022.01)

(52) U.S. Cl.
CPC ........ *H04L 45/308* (2013.01); *H04L 65/1016* (2013.01); *H04L 65/1069* (2013.01)

(58) Field of Classification Search
CPC .......................... H04L 45/308; H04L 65/1016; H04L 65/1069
See application file for complete search history.

(56) References Cited

U.S. PATENT DOCUMENTS

2018/0184277 A1* 6/2018 Suzuki ............... H04L 65/1073
2025/0310748 A1* 10/2025 Mirza .................... H04L 61/50

FOREIGN PATENT DOCUMENTS

DE       102022121503 A1 * 3/2024 ......... H04L 65/1016

* cited by examiner

*Primary Examiner* — Kamal M Hossain
(74) *Attorney, Agent, or Firm* — Lee & Hayes, P.C.

(57)       ABSTRACT
Techniques are described herein for providing improved IMS service routing. The techniques may be performed by a P-CSCF node operating within an IMS network. In embodiments, such techniques may comprise receiving a communication relating to a service to be provided to a user equipment (UE). The techniques may then comprise providing, to a Home Subscriber Server (HSS), information related to the UE, obtaining, from a Home Subscriber Server (HSS), profile data related to the UE, and making, by the P-CSCF node, a determination about the service to be provided to the UE based on the profile data related to the UE. The techniques may then comprise routing, by the P-CSCF node, a message to an electronic device based on the determination about the service to be provided.

18 Claims, 7 Drawing Sheets

500

UE
108

P-CSCF
110

S-CSCF
112

AS
118

HSS
216

502

504 (a)

504 (b)

506

508

510 (a)

510 (b)

512

514

TECHNIQUES FOR OPTIMIZING IMS SERVICE ROUTING

BACKGROUND

Internet Protocol Multimedia Subsystem (IMS) is an architectural framework defined by the 3rd Generation Partnership Project (3GPP) for delivering Internet Protocol (IP) multimedia to user equipment (UE) of an IMS network. An IMS core network (sometimes referred to as the "IMS core") permits wireless and wireline devices to access IP multimedia, messaging, and voice applications and services. IMS allows for peer-to-peer communications, as well as client-to-server communications over an IP-based network.

The IMS network may use various call session control function (CSCF node) nodes to receive and process Session Initiation Protocol (SIP) signaling packets in the IMS. For instance, the IMS network may include a proxy-CSCF node (P-CSCF node) node to be the first point of contact for the UE to register to the network. The P-CSCF node may interface with core components to authenticate the UE. The core components may include serving-CSCF node (S-CSCF node) nodes, interrogating-CSCF node (I-CSCF node) nodes, and telephony application servers (TAS).

During a registration procedure with the IMS network, the UE may be assigned a S-CSCF node and an application server (AS). These assigned nodes may be tasked with serving the UE during a subsequent communication session, and all signaling originating from, and terminating at, the UE during the communication session is to be routed through the assigned nodes of the IMS core.

In a typical IMS network, the signal for a communication session is routed between various nodes of the IMS network, with the assigned nodes of the IMS core bearing the heavier load. With an increasing number of UEs being added to the network daily, this heavier load may create a huge burden on the IMS core.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
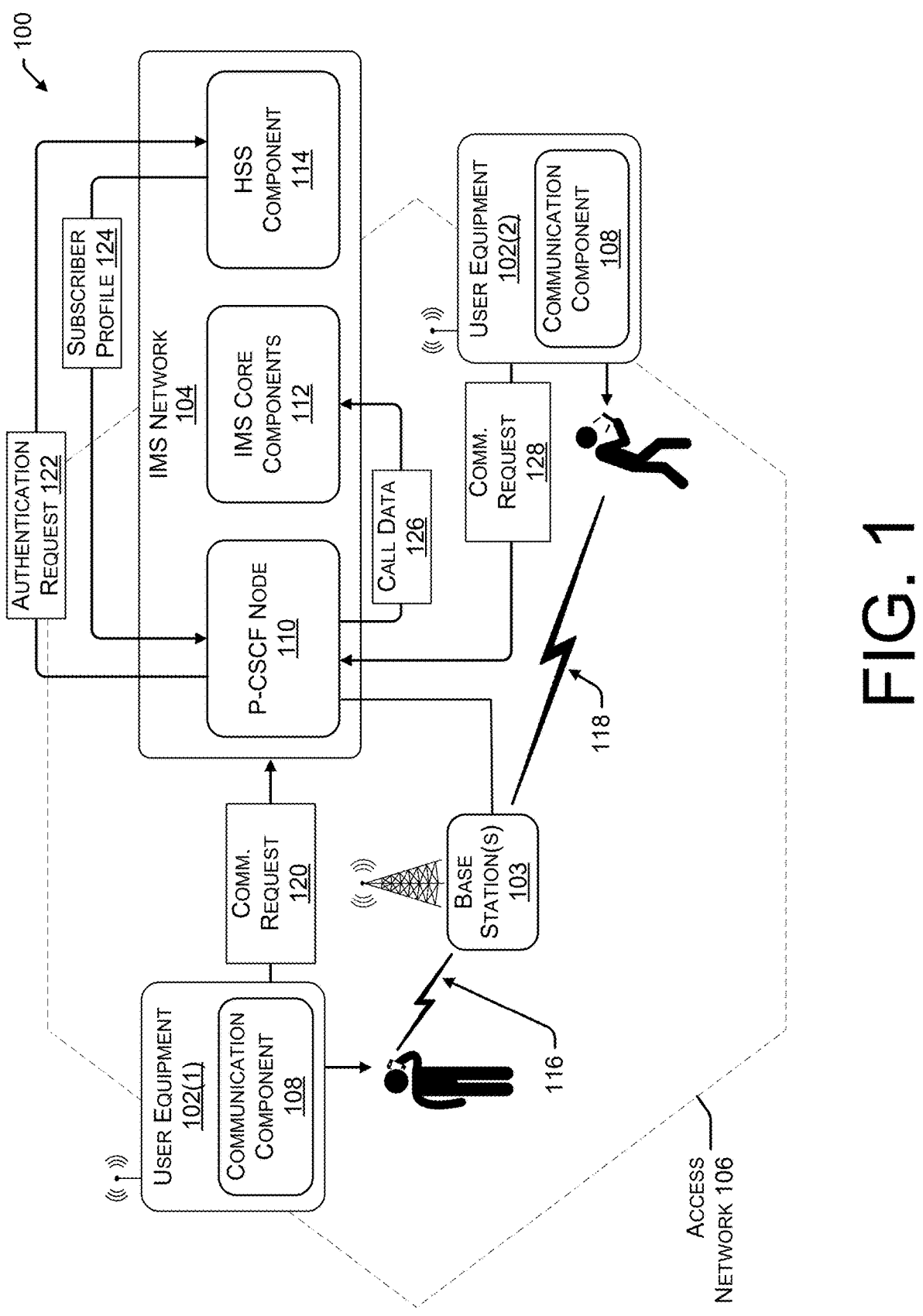
FIG. 1 illustrates an example system including user equipment and telecommunication network configured to optimize interactions between components of an IMS network.

Techniques for optimizing P-CSCF node connectivity with HSS in an IMS network are discussed herein. The present system includes components configured to optimize signal flow in an IMS network by enabling P-CSCF node to directly interface with HSS in response to a network access request from a user equipment (UE). In an example IMS network environment, a user (also referred to as "subscriber") associated with the UE may request access to a network to use IP multimedia services such as a voice call or text. The IMS network may include IMS nodes to handle signal flow to process the communication session (also referred to as "call"). The IMS nodes may include P-CSCF nodes, IMS core components, and home subscriber servers (HSS). The IMS core components may include serving-CSCF node (S-CSCF node) nodes, interrogating-CSCF node (I-CSCF node) nodes, and telephony application servers (TAS).

The present system enables the P-CSCF node to directly interface with HSS, which optimizes signal processing for an improved IMS network and presents several advantages over a typical IMS network. In a typical IMS network, the P-CSCF node receives a request signal from the UE and sends an authentication request for the UE to IMS core components, wherein the procedural burden is transferred over the IMS core components. In the present system with optimized P-CSCF node connectivity with HSS, the network may configure the P-CSCF node to directly interface with the HSS in order to authenticate the UE and may download an associated subscriber profile prior to transmitting the signal to the IMS core components to process the call. As will be described herein, the disclosed system will not only reduce the load on the IMS core components but will also enable additional functions to be performed at the P-CSCF node in order to help restore network failure while minimizing load on the IMS core components.

In some examples, the system may configure a home subscriber server ("HSS" or "subscriber server") to maintain a subscriber database for subscription-related information to support call flow. The subscriber server may receive an authentication request from an IMS node. In response to receiving the request, the subscriber server may perform a series of checks to determine if the UE is associated with a subscription and the service policies for the subscription. In some examples, the subscriber profile may also indicate the capabilities of the UE. In various examples, the subscriber server stores subscriber profiles that are used for authentication and authorization.

In an example typical IMS network, the P-CSCF node may send authentication requests to the IMS core components and pass on the procedural load. To initiate a communication session on a UE, the request signal from the UE may first enter the IMS network through the P-CSCF node. The P-CSCF node may determine to authenticate the subscriber and/or associated UE through the IMS core components. The IMS core components may include S-CSCF nodes and I-CSCF nodes to perform different procedures for routing the communication signal. For the UE to register on the network, the network may send a call flow to request the technical capabilities of the UE. In the present example typical IMS network, the core nodes send the request to the HSS and perform authentication procedures. The TAS may interface with HSS to download subscriber profiles to be used at IMS core components. Using the subscriber profile, the IMS core components may process the UE request for service. In the example typical IMS network, the P-CSCF node is removed from the signal flow once the authentication request is sent to the IMS core components, which puts a significant processing load on the IMS core components.

In an example optimized IMS network, the P-CSCF node may send authentication requests to the HSS and bypass adding procedural load to the IMS core components. Similar to the typical IMS network, to initiate a communication session on a UE, the request signal from the UE may first enter through the P-CSCF node. However, unlike the typical IMS network, instead of authenticating the UE through the IMS core components, the P-CSCF node may interface with the HSS to authenticate the UE and also download and store the subscriber profile. In the present example, the P-CSCF node may use the subscriber profile to determine the eligibility of the UE to access network services before transmitting the communication to the IMS core components to process the call. In various examples, because the P-CSCF node is storing subscriber profiles, in the event of network failure, the P-CSCF node may use the stored subscriber profiles to help restore the network rather than flood the IMS core components with renewed authentication requests.

The present system, with optimized flow for P-CSCF node, allows a direct interface between P-CSCF node and HSS, which presents additional benefits. This direct interface allows the P-CSCF node to use the subscriber profiles to maintain International Mobile Subscriber Identity (IMSI) range-related decision-making abilities. The IMSI range may be defined by the network to indicate equipment status. In various examples, the P-CSCF node may determine to enforce policies based on the IMSI range before the communication session is processed on the IMS core components. In these examples, such a determination may reduce extra signaling and mitigate network vulnerability to exposure to distributed denial-of-service (DDoS) attacks, due to the PCSCF node blocking IMSI ranges prior to transmitting the communication session to the IMS core components. Additionally, and/or alternatively, the P-CSCF node may also flag IMSIs to HSS to inform of any ambiguous activity to be barred. In various examples, the P-CSCF node may also directly instruct HSS on IMPU/IMSI based on what has been observed. This will allow HSS to enforce any blocking policy based on network feedback.

The systems and methods described herein can be used to optimize signal handling in an IMS network by enabling a direct interface between P-CSCF node and HSS. In particular, the direct interface allows the P-CSCF node to bypass IMS core components to authenticate subscribers directly, and this direct interface may reduce latency. This direct interface between P-CSCF node and HSS reduces the authentication signaling load on the IMS core components. In additional examples, the P-CSCF node may further reduce the load by performing REG/RE-FRESH and other SIP methods previously performed by the IMS core components. Reducing the load on IMS core components may enable more call processing capacity from the components. Moreover, by allowing the P-CSCF node to enforce policies and/or block IMSI ranges, the system may refrain from performing unnecessary communication session data transmission, which reduces network bandwidth usage. These and other improvements to the functioning of a computer and network are discussed herein.

In some examples, the techniques discussed herein can be implemented in the context of networks using/associated with one or more of 3G, 4G, 4G LTE, 5G protocols. In some examples, the network implementations can support standalone architectures, non-standalone architectures, dual connectivity, carrier aggregation, etc. Example implementations are provided below with reference to the following figures.

FIG. 1 illustrates an example system 100 including user equipment and telecommunication network configured to optimize interactions between components of an IMS network. In embodiments, such optimization may involve enabling direct P-CSCF node connectivity with an HSS.

The user equipment (UE) 102(1) and user equipment 102(2) (collectively referred to as UE 102) can communicatively connect with other devices, including devices serviced by a base station 103 in communication with an IMS Network 104. In an example, the example system 100 shows a UE 102(1) and a UE 102(2) attempting to connect to the IMS Network 104 via at least one base station 103 of a telecommunication network to engage in communication sessions for voice calls, video calls, messaging, data transfers, and/or any other type of communication. The UE 102 can be any interworking device that can connect and communicate between the next-generation network (e.g., 5G SA) and the legacy network (e.g., 4G LTE). In some examples, the UE 102 can be a mobile phone, such as a smartphone or other cellular phone. In other examples, the UE 102 can be a personal digital assistant (PDA), a media player, a tablet computer, a gaming device, a smartwatch, a hotspot, a personal computer (PC) such as a laptop, desktop, or workstation, or any other type of computing or communication device.

The UE 102 may include a communication component 108. In some examples, the communication component 108 may configure a communication client to support voice and/or video communications. In some examples, the UE 102 may initiate voice communication using the communication client to transmit session data, including identification information for the caller and recipient.

In some examples, the UE 102 can wirelessly connect to one or more base stations 103 or other access points of the access networks (e.g., access network 106), and in turn, be connected to the network(s) (e.g., IMS Network 104) via the base stations or other access points. In some examples, the access network 106 can be a packet core network of an LTE network, which may be referred to as an Evolved Packet Core (EPC). In other examples, the access network 106 can be a 5G core network.

The IMS Network 104 can include a P-CSCF node 110, a number of IMS core components 112, and a HSS component 114. In some instances, the IMS Network 104 can include implementing one or more communication servers to facilitate communications by and between the various devices in the system 100. That is, the IMS Network 104 can represent any computing devices implementing various aspects of one or more of second, third, fourth generation, and fifth generation (2G, 3G, 4G, and 5G) cellular wireless access technologies, which may be cross-compatible and may operate collectively to provide data communication services.

Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the base station 103 may implement GSM, UMTS, LTE/LTE Advanced, and/or NR telecommunications technologies.

In some instances, telecommunication technologies can be referred to generally as radio access technology. Thus, a 5G network can represent 5G radio access technology. The base station 103 and access network 106 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the base station 103, the access network 106. In some embodiments, the IMS Network 104 may be operated by one or more service providers.

The IMS core components 112 may implement functions to process calls and/or determine call logic. In various examples, the IMS core components 112 may implement calling features like call forwarding, voicemail, and conference bridges. In some examples, the IMS core components 112 may provide additional multimedia features and can include features like multimedia messaging, video calling, and the integration of multiple devices to a subscriber account. The IMS core components 112 may perform functions that are not directly related to the routing of communication data through the network but rather determine the signal flow. In various examples, the IMS core components 112 may use a Sh Diameter Interface, or any application protocol, as the interface to communicate with other network components.

The HSS component 114 may configure a database containing subscription-related information to support the network. The HSS component 114 can collect data associated with subscribers, subscriber sessions, and/or registrations in a database. In various examples, the HSS component 114 may utilize a common data repository, a shared database providing support for 2G/3G/4G/5G core, to store subscriber-related data, including subscriber information. The HSS component 114 may collect and store information specific to the subscriber accounts and subscription, including one or more of: authorized user(s), username(s), account identifier, subscription, services, and the like. The HSS component 114 can also collect information specific to one or more UEs associated with a subscriber account, including a device type, a device identifier, communications capabilities, and the like. The HSS component 114 may receive information from the UE, including one or more Subscriber Identity Module (SIM), SIM profile, Mobile Station International Subscriber Directory Number (MSISDN), an International Mobile Subscriber Identity (IMSI), International Mobile Equipment Identity (IMEI), and the like.

The HSS component 114 may handle Authentication requests. In some examples, the HSS component 114 may receive a Terminating Access Domain Selection (T-ADS) request. In response to receiving the T-ADS request, the HSS component 114 may perform a series of checks to determine if the terminating UE is currently connected to a supported network (e.g., 5G SA network).

While FIG. 1 illustrates the access network(s) 106, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the access network(s) 106 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user equipment 102 can communicate with any number of user equipment, user devices, internet-of-things (IOT) devices, servers, network devices, computing devices, and the like.

As a non-limiting example, the example system 100 can illustrate an example process to optimize P-CSCF node connectivity with HSS. For example, an example UE 102(1) and an example caller UE 102(2) may attempt to initiate a voice call over an example telecommunication network that includes an example IMS Network 104 via access network 106.

In the present example, the example UE 102(1) attempts to initiate a communication session in access network 106 that is being served by the example IMS Network 104 and is connected to the network via an example connection 116. To initiate a communication session on the example UE 102(1), a communication request 120 is sent from the UE to the example IMS Network 104 and may first enter through the P-CSCF node 110. However, unlike the typical IMS network, instead of authenticating the UE through the IMS core components 112, the P-CSCF node 110 may interface with the HSS component 114 to authenticate the UE by sending an authentication request 122. In response, the HSS component 114 may transmit the example subscriber profile 124. The P-CSCF node 110 may also download and store the example subscriber profile 124. In the present example, the P-CSCF node 110 may use the example subscriber profile 124 to determine the eligibility of the example UE 102(1), to access network services before transmitting the example call data 126 for the IMS core components 112 to process the call. In various examples, because the P-CSCF node 110 is storing subscriber profiles, in the event of network failure, the P-CSCF node 110 may use the stored subscriber profiles to help restore the network rather than flood IMS core components 112 with renewed authentication requests.

In a second example, the example UE 102(2) attempts to initiate a communication session in access network 106 that is being served by the example IMS Network 104 and is connected to the network via an example connection 118. To initiate a communication session on the example UE 102(2), the communication request 128 is sent from the UE to the example IMS Network 104 and may first enter through the P-CSCF node 110. The P-CSCF node 110 may repeat the steps performed above to authenticate the example UE 102(1), and receive a second example subscriber profile 124. The P-CSCF node 110 may also download and store the second example subscriber profile 124 associated with example UE 102(2).

Figure 2:
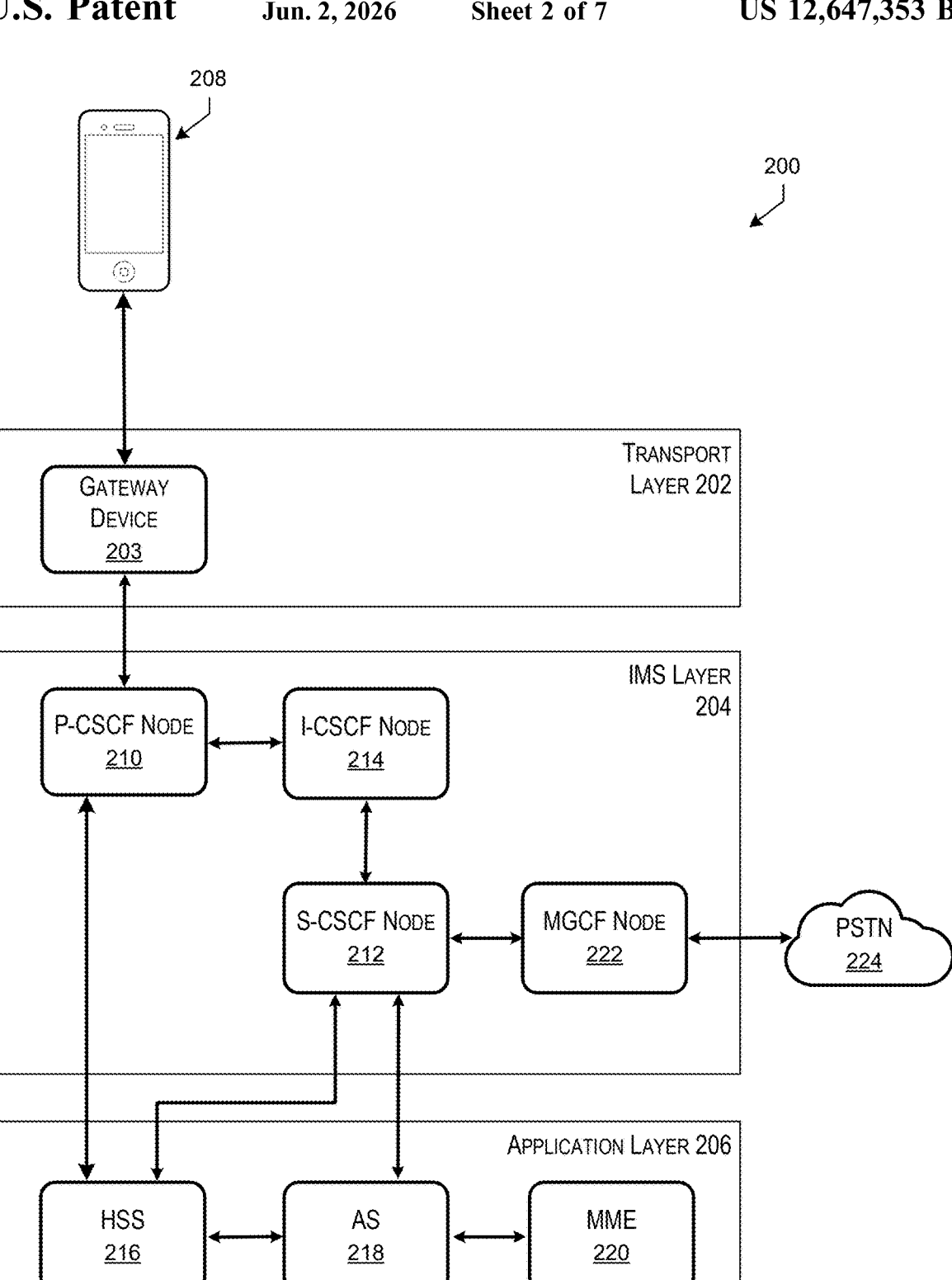
FIG. 2 depicts a diagram illustrating an overview of a network architecture having a number of components that may be implemented in accordance with some embodiments.

FIG. 2 depicts a diagram illustrating an overview of a network architecture 200 having a number of components that may be implemented in accordance with some embodiments. In embodiments, the network architecture 200 may be made up of multiple layers, each of which includes a different set of nodes. For example, the network architecture 200 may be representative of an IMS network that includes at least a transport layer 202, an IMS layer 204, and an application layer 206.

A transport layer 202 is responsible for connecting different access technologies users' devices to the IMS domain and for connection of the domain to other packet-switched and circuit-switched networks. A transport layer 202 may include any node (e.g., equipment) configured to provide access (e.g., ingress/egress) to the network architecture 200 for a number of user equipment (UE) 208. For example, a transport layer 202 may include a gateway device, such as a gateway device 203 that provides fixed access (e.g., digital subscriber line (DSL), cable modems, Ethernet, FTTx), mobile access (e.g., 5G NR, LTE, W-CDMA, CDMA2000, GSM, GPRS), and/or wireless access (e.g., WLAN, WiMAX) through an access network (e.g., access network 106 as described in FIG. 1).

An IMS layer 204 (also referred to as a control layer) may contain IMS core components (e.g., IMS core components 112 as described in relation to FIG. 1) that include any node configured to process SIP signaling packets within the network architecture 200. Such nodes may generally be referred to as Call Session Control Function (CSCF) nodes. CSCF nodes can be further distinguished based on their respective roles. For example, CSCF nodes may include a Proxy CSCF (P-CSCF), a Service CSCF (S-CSCF), and an Interrogating CSCF (I-CSCF). It is to be appreciated that the IMS network can include additional nodes that are not described herein such as nodes including, without limitation, an emergency CSCF (E-CSCF) node, a security gateway (SEG), a session border controller (SBC), and so on. In some cases, the IMS layer 204 may further include a Home Subscriber Server (HSS) 216. It should be noted that while the HSS 216 is depicted in the Application layer 206 in FIG. 2, the HSS 216 may instead be implemented within an IMS layer 204 in some embodiments of a network architecture 200 or even outside of the IMS network.

A P-CSCF node is a proxy device that acts as a first point of contact for UE 208 within the IMS Network. Each UE is assigned to a respective P-CSCF when it is registered with the IMS Network. A P-CSCF node can receive, via a communications interface, a Session Initiation Protocol (SIP) request from the UE 208 to be forwarded to a S-CSCF.

A S-CSCF node is the central nodes of the signaling plane and sits on the path of all signaling messages to/from a UE 208 that is assigned to it. There can be multiple S-CSCFs in the network for load distribution and high availability reasons. A S-CSCF is typically assigned to a user (or UE) by a Home Subscriber Server (HSS), when it's queried by the I-CSCF.

A S-CSCF node 212 may represent one of multiple available S-CSCF nodes (e.g., 212(A-C)) that is chosen (or otherwise selected) for assignment to the UE 208. S-CSCF nodes, such as the S-CSCF node 212(A), are sometimes referred to as "Registrars," and the process of allocating Registrars among users who are registering for IMS-based services is sometimes referred to as finding a "home CSCF" for the UE 208.

A I-CSCF node 214 is a SIP function node that acts as a forwarding point for external devices. The I-CSCF node 214 queries the HSS to determine S-CSCF/UE mapping and forwards SIP requests between the P-CSCF node 210 and the respective S-CSCF node 212.

The HSS 216 may implement a master user database that supports the IMS network nodes that handle the calls/ sessions. HSS 216 may be an example of the HSS component 114 as described in relation to FIG. 1 above. It contains user profiles, performs authentication and authorization of the user, and can provide information about the physical location of a user. A user profile may be associated with each UE 208 and may contain information about the current user. Such information may be downloaded by the S-CSCF assigned to the user when the user is registered on the network. The S-CSCF may typically receive that information in a User-data Attribute Value Pair (AVP) format.

The HSS 216 may collect and store information specific to the subscriber accounts and subscription, including one or more of: authorized user(s), username(s), account identifier, subscription, and the like. The HSS 216 can also collect information specific to one or more UEs associated with a subscriber account, including a device type, a device identifier, communications capabilities, and the like. The HSS 216 may receive information from the UE 208 including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

An application layer 206 (also referred to as a service layer) may include one or more nodes capable of providing IMS-related services to the UE 208. In embodiments, the application layer 206 may include at least a number of Application Servers (AS) 218, as well as a Mobility Management Entity (MME) 220. As noted above, the application layer 206 may further include a HSS 216 in some embodiments.

An AS 218 hosts and executes services, and interface with the S-CSCF using messages formatted using a SIP protocol. Depending on the actual service, the AS 218 can operate in SIP proxy mode, SIP UA (user agent) mode or SIP B2BUA mode. An AS 218 can be located in the network architecture 200 or in an external third-party network. If located in the network architecture 200, it may be able to query, or otherwise interact with the HSS 216 (e.g., using Diameter interfaces). In embodiments, the AS 218 manages an application that provides communication between two or more UEs (e.g., UE 208 and at least one other UE). For example, the AS 218 may manage an application that provides Voice over IP (VoIP) communications between UE devices.

In embodiments, an AS 218 may be configured to make service initiation decisions based on information about a UE 208 to which a communication is being directed. For example, the AS 218 may receive a communication directed to initiation of a service at a UE 208. By way of illustration, another UE may initiate a Voice over Internet Protocol (VoIP) call to a UE 208. In this illustration, the AS 218 receives a request to initiate the VoIP call as well as an identifier for the UE 208. Upon receiving such a communication, the AS 218 may retrieve information about the UE 208 from a second entity that maintains updated information about a status of the UE 208. Such a communication may be routed through the HSS 216. For example, the AS 218 may provide a request to the HSS 216 (which maintains information about services associated with the account for that UE 208) and the HSS 216 further communicates with an MME 220 to retrieve such information. The AS 218 may then make a determination about whether the service should or should not be initiated based on the received information and absent additional communications within the network architecture 200.

The network architecture 200 may include at least one node that provides a Media Gateway Control Function (MGCF) (e.g., MGCF node 222) that enables interaction between the IMS network and at least one other network, such as a telephonic network (Public Switched Telephone Network (PSTN) 224). In embodiments, a MGCF node may be configured to translate between SIP messaging and other formats in order to facilitate inter-network messaging.

The UE 208 may include any electronic device capable of interacting with the network architecture 200. In some non-limiting examples, the UE 208 may be a variety of devices including, for example: a mobile phone, a personal data assistant (PDA), or a mobile computer (e.g., a laptop, notebook, notepad, tablet, etc.) having mobile wireless data communication capability. The UE 208 may be configured to register for, and thereafter access and utilize, one or more IMS-based services via the network architecture 200. To this end, the UE 208 may be configured to transmit, via a radio access network (RAN), messages to the IMS network. For example, the UE 208 may transmit messages to the IMS network as part of an IMS registration procedure where the UE 208 is requesting to register for an IMS-based service.

In operation, the UE 208 may, upon registration with the network architecture 200, be assigned to a P-CSCF node 210 as well as a S-CSCF node 212. Communications from the UE 208 to an AS 218 of the network architecture 200 are then typically routed from the UE 208 to the P-CSCF node 210 and then to the S-CSCF node 212 (through forwarding by the I-CSCF node 214) and subsequently to the AS 218. Conversely, communications from an AS 218 of the network architecture 200 to the UE 208 are routed from the AS 218 to the S-CSCF node 212 and then to the P-CSCF node 210 and subsequently to the UE 208.

During operation, when the P-CSCF node 210 receives a SIP request in relation to the UE 208, that P-CSCF node 210 may make decisions (e.g., routing decisions) about the SIP request based on the information about the UE 208.

In a first example, the P-CSCF node 210 may receive a communication (e.g., a SIP request) from the UE 208 that relates to the use of an IMS service provided by an AS 218. In this example, upon receiving the communication, the P-CSCF node 210 may initiate a communication session with the HSS 216. Upon establishing such a communication session, the P-CSCF node 210 may provide information about the UE 208 to the HSS 216, which may include information that can be used to identify the UE (and/or an account associated with the UE) as well as the service to be accessed. The HSS 216 may then retrieve information stored in relation to the request to be provided back to the UE 208 via profile date. In some cases, the HSS 216 may identify a number of data fields that are relevant to the service that the UE is requesting access to and may provide data values related to those identified data fields in the profile data.

Once the P-CSCF node 210 has received the profile data, it makes a determination related to the request received from the UE 208 based on the information included in that profile data, as to whether the requested IMS service is available/accessible to the UE 208. In some cases, this may involve making a determination as to whether the service is capable of being supported by the UE 208 based on a type or model of the UE 208. In other cases, this may involve making a determination as to whether a service level agreement (SLA) for the UE 208 permits such an IMS service for the UE 208.

In a second example, the P-CSCF node 210 may receive a SIP request from the AS 218 that is directed to the UE 208. In such an example, the P-CSCF node 210 may make a determination as to whether the SIP request should be forwarded to the UE 208. Like the example above, the P-CSCF node 210 may make a determination, based on the information about the UE 208 received in the profile data, as to whether the requested IMS service is available/accessible to the UE 208.

In accordance with various embodiments described herein, the terms "user equipment (UE)," "wireless communication device," "wireless device," "communication device," "mobile device," and "client device," may be used interchangeably herein to describe any UE (e.g., the UE 208) that is capable of transmitting/receiving data over the IMS network, perhaps in combination with other networks. A users can utilize the UE 208 to communicate with other users and associated UEs via the IMS network. For example, a service provider may offer multimedia telephony services that allow a subscribed user to call or message other users via the IMS network using his/her UE 208. A user can also utilize the UE 208 to receive, provide, or otherwise interact with various different IMS-based services by accessing the IMS network. In this manner, an operator of the IMS network may offer any type of IMS-based service, such as, telephony services, emergency services (e.g., E911), gaming services, instant messaging services, presence services, video conferencing services, social networking and sharing services, location-based services, push-to-talk services, and so on.

Furthermore, the IMS network that includes the IMS nodes 210-214 may enable peer-to-peer, client-to-client, and/or client-to-server, communications over wired and/or wireless networks using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The network architecture 200 of FIG. 2 may be maintained and/or operated by one or more service providers, such as one or more wireless carriers ("operators"), that provide mobile IMS-based services to users (sometimes called "subscribers") who are associated with UEs, such as the UE 208. The IMS network may represent any type of SIP-based network that is configured to handle/process SIP signaling packets or messages. SIP is a signaling protocol that can be used to establish, modify, and terminate multimedia sessions (e.g., a multimedia telephony call) over packet networks, and to authenticate access to IMS-based services. Individual nodes of the IMS nodes 210-214 of FIG. 2 can also be configured to transmit data to/from the HSS 216 using Diameter protocol over a Diameter (Cx) interface. Diameter protocol is defined by the Internet Engineering Task Force (IETF) in RFC 6733.

For clarity, a certain number of components are shown in FIG. 2. It is understood, however, that embodiments of the disclosure may include more than one of each component. In addition, some embodiments of the disclosure may include fewer than or greater than all of the components shown in FIG. 2. In addition, the components in FIG. 2 may communicate via any suitable communication medium (including the Internet), using any suitable communication protocol.

Figure 3:
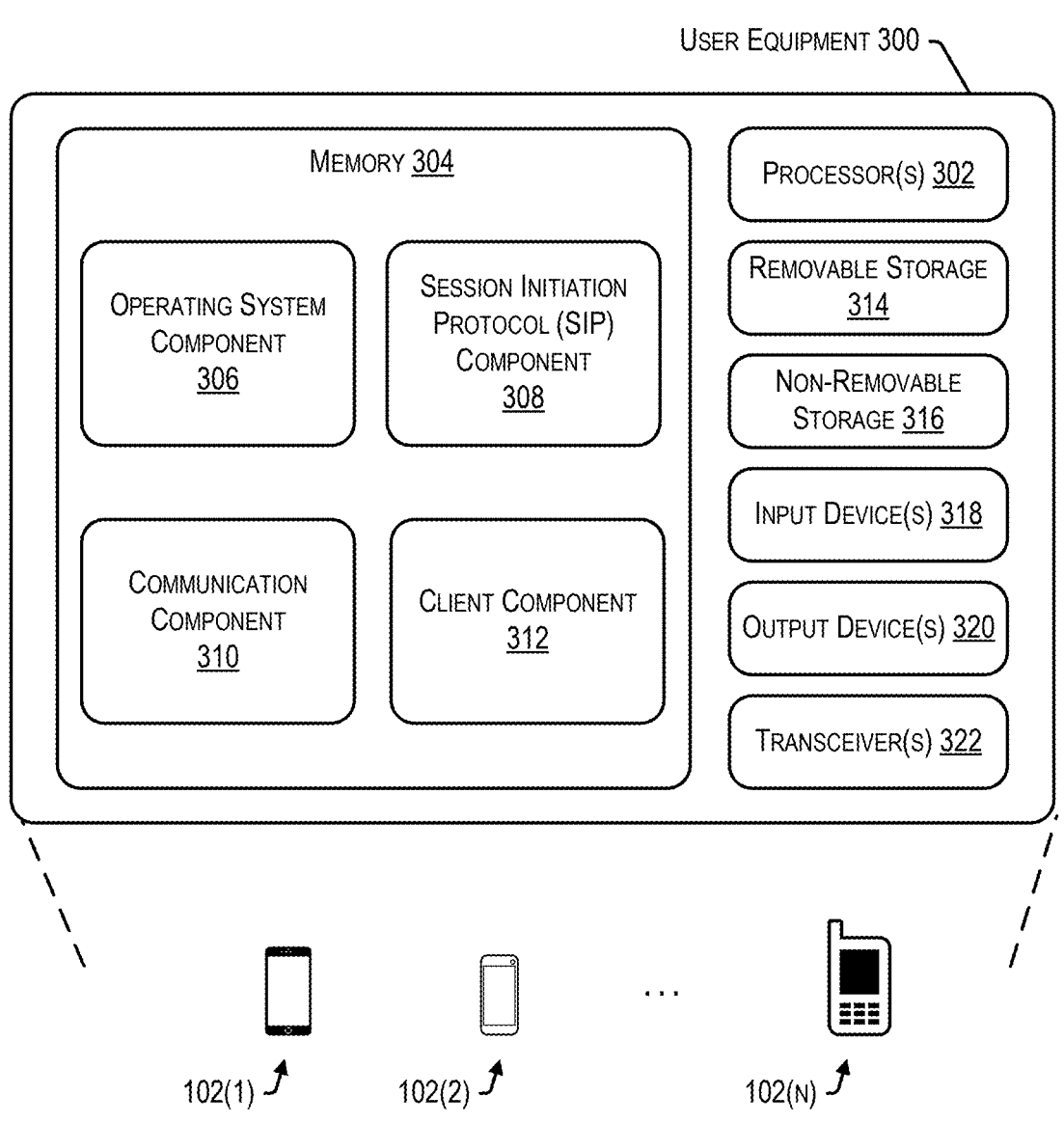
FIG. 3 illustrates an example user equipment configured to implement the communication components, in accordance with embodiments of the disclosure.

FIG. 3 illustrates an example user equipment 300 configured to implement the communication components, in accordance with embodiments of the disclosure. In some embodiments, the user equipment 300 can correspond to the user equipment 102 of FIG. 1. It is to be understood in the context of this disclosure that the user equipment 300 can be implemented as a single device or as a plurality of devices with components and data distributed among them. By way of example, and without limitation, the user equipment 300 can be implemented as various user equipment 300(1), 300(2), . . . , 300(N).

As illustrated, the user equipment 300 comprises a memory 304 storing an operating system component 306, a Session Initiation Protocol (SIP) component 308, a communication component 310, and a client component 312. Also, the user equipment 300 includes processor(s) 302, a removable storage 314 and non-removable storage 316, input device(s) 318, output device(s) 320, and transceiver(s) 322.

In various embodiments, the memory 304 is volatile (such as RAM), non-volatile (such as ROM, flash memory, etc.) or some combination of the two. The operating system component 306, the SIP component 308, the communication component 310, and the client component 312 stored in the memory 304 can comprise methods, threads, processes, applications, or any other sort of executable instructions. The operating system component 306, the SIP component 308, the communication component 310, and the client component 312 can also include files and databases.

The operating system component 306 can include functionality to identify and track the different applications installed on the user equipment 300. The operating system component 306 can include functionality to query a chipset of the user equipment 300, and/or query the transceiver(s) 322, to instruct the transceiver(s) 322 and/or any software or hardware to scan one or more channels or frequency resources to determine metrics associated with the channel or frequency resources, for example. In some instances, the operating system component 306 can include an API to receive instructions from one or more of the SIP component 308, the communication component 310, and the client component 312 and to provide data to the corresponding components, including identifying the communication clients and/or communication capabilities of the user equipment 300 and/or a serving network, and notifying the components of clients and/or capabilities. The serving network may include one or more network(s) that the user equipment 300 is currently communicatively connected to. For instance, user equipment 300 may be connected to a 5G cellular network and/or connected to a home Wi-Fi network.

The SIP component 308 may enable communications to be served using SIP instances and/or SIP messages. The SIP component 308 may transmit SIP messages containing information for identifying the user account, user equipment, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 308 may use SIP signaling and determine the current location of the user equipment 300 using a Global Positioning System (GPS). IT should be noted that while a SIP component 308 is depicted as being included in the user equipment 300, some embodiments may not include such a component. Note that the user equipment may communicate with the P-CSCF node using a different communication protocol and the P-CSCF node may translate such communications into SIP communications.

In some examples, a phone mode may be determined based at least in part on a location (e.g., the current location) associated with user equipment. For example, if the current location of the user equipment 300 is within a geographic area in which a service provider, associated with an identifier of the user equipment 300, provides coverage, then the phone mode may be set to carrier mode. If the current location of the user equipment 300 is in a geographic area in which the service provider does not provide coverage, then the phone mode may be set to Over-The-Top (OTT) mode. In some examples, the SIP component 308 may determine, based on the phone mode not set to carrier mode, that certain carrier-specific functions may be unavailable, including, but not limited to, selecting certain types of communications or client designations. For instance, the SIP component 308 may determine the user equipment 300 is currently not in carrier mode and may not be able to use certain features of the 5G SA network.

In various examples, the SIP component 308 may transmit SIP messages with headers and/or strings to trigger specific functions and/or commands. As described herein, the SIP information may include information identifying an originating party and a terminating party. Additionally, the SIP information may include one or more commands: PUBLISH, SUBSCRIBE, NOTIFY, and the like.

The communication component 310 may determine the capability of the user equipment 300 and the serving network to determine the enabled feature information for a communication client (e.g., client component 312). As described herein, the serving network may include one or more network(s) that the user equipment 300 is currently registered to. In response to registering to a network, communication component 310 may send, to the network, a publish request to set the enabled feature information of the communication client. While the communication component 310 may send the enabled feature information to the network, it is understood in the context of this document that the user equipment 300 may send and/or receive the enabled feature information via the SIP component 308, the communication component 310, the client component 312, and/or another component. Additionally, and/or alternatively, the user equipment 300 may send the enabled feature information to the network in response to an interrogation poll rather than as a publish request.

The communication component 310 may send a subscribe request to poll the communications capabilities of a terminating UE to the network. In response to the subscribe request, the communication component 310 may receive a "NOTIFY" response, including a capability set for the terminating UE from the network. The communication component 310 may apply the capability set when communicating with the terminating UE.

The communication component 310 may include functionality to send and receive communications (e.g., voice calls, texts, instant messages, etc.) and/or determine when to transition an existing communication from one access network to another. In some examples, the communication component 310 may perform a number of functions, such as interfacing with the transceiver(s) 322, preparing the user equipment 300 to receive communications, tuning the transceiver(s) 322, receiving and processing an invitation message such as a SIP instance received via the transceiver(s) 322, and the like.

The client component 312 may configure a communication client to send and receive communications. In some examples, the client component 312 may configure some features of the communication client based on the capability set of the originating UE and the terminating UE. The client component 312 may enable or disable features of the communication client, including changing a communication type and/or scale the quality and/or resolution of videos and/or multimedia files used in the communication. For instance, an originating UE may use 5G SA features; however, if the communication component 310 determines the terminating UE only have 4G features enabled, the client component 312 may disable some of the 5G specific features in the client component 312.

In various examples, the client component 312 may generate a user interface to send and receive communication data. The client component 312 may be configured to send and receive communication for one or more subscriber accounts (e.g., personal cellphone, work cellphone, etc.). The client component 312 may be configured to use a particular account of the one or more subscriber accounts to originate a communication with.

In some embodiments, the processor(s) 302 is a central processing unit (CPU), a graphics processing unit (GPU), or both CPU and GPU, or other processing unit or component known in the art.

The user equipment 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and non-volatile, removable and non-removable media implemented in any method or technology for storage of information, such as computer-readable instructions, data structures, program modules, or other data. Note that computer-readable media may be non-transitory. Memory 304, removable storage 314, and non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 300. Any such tangible computer-readable media can be part of the user equipment 300.

In various embodiments, the user equipment 300 can include applications including but are not limited, a web browser application, a video streaming application, an online gaming application, a network analyzer, and the like. During execution on the user equipment 300, each of the applications may be configured to cause the user equipment 300 to initiate communications with a network device (e.g., network node 400) over the access network(s) 106.

The user equipment 300 may be configured to communicate over a telecommunications network using any common wireless and/or wired network access technology. Moreover, the user equipment 300 may be configured to run any compatible device operating system (OS), including but not limited to, Microsoft Windows Mobile, Google Android, Apple iOS, Linux Mobile, as well as any other common mobile device OS.

The user equipment 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the user equipment 300 also includes one or more wired or wireless transceiver(s) 322. For example, the transceiver(s) 322 can include a network interface card (NIC), a network adapter, a LAN adapter, or a physical, virtual, or logical address to connect to the IMS Network 104, or to the network device (e.g., network node 400), for example. To increase throughput when exchanging wireless data, the transceiver(s) 322 can utilize multiple-input/multiple-output (MIMO) technology. The transceiver(s) 322 can comprise any sort of wireless transceivers capable of engaging in wireless, radio frequency (RF) communication. The transceiver(s) 322 can also include other wireless modems, such as a modem for engaging in Wi-Fi, WiMax, Bluetooth, infrared communication, and the like.

Figure 4:
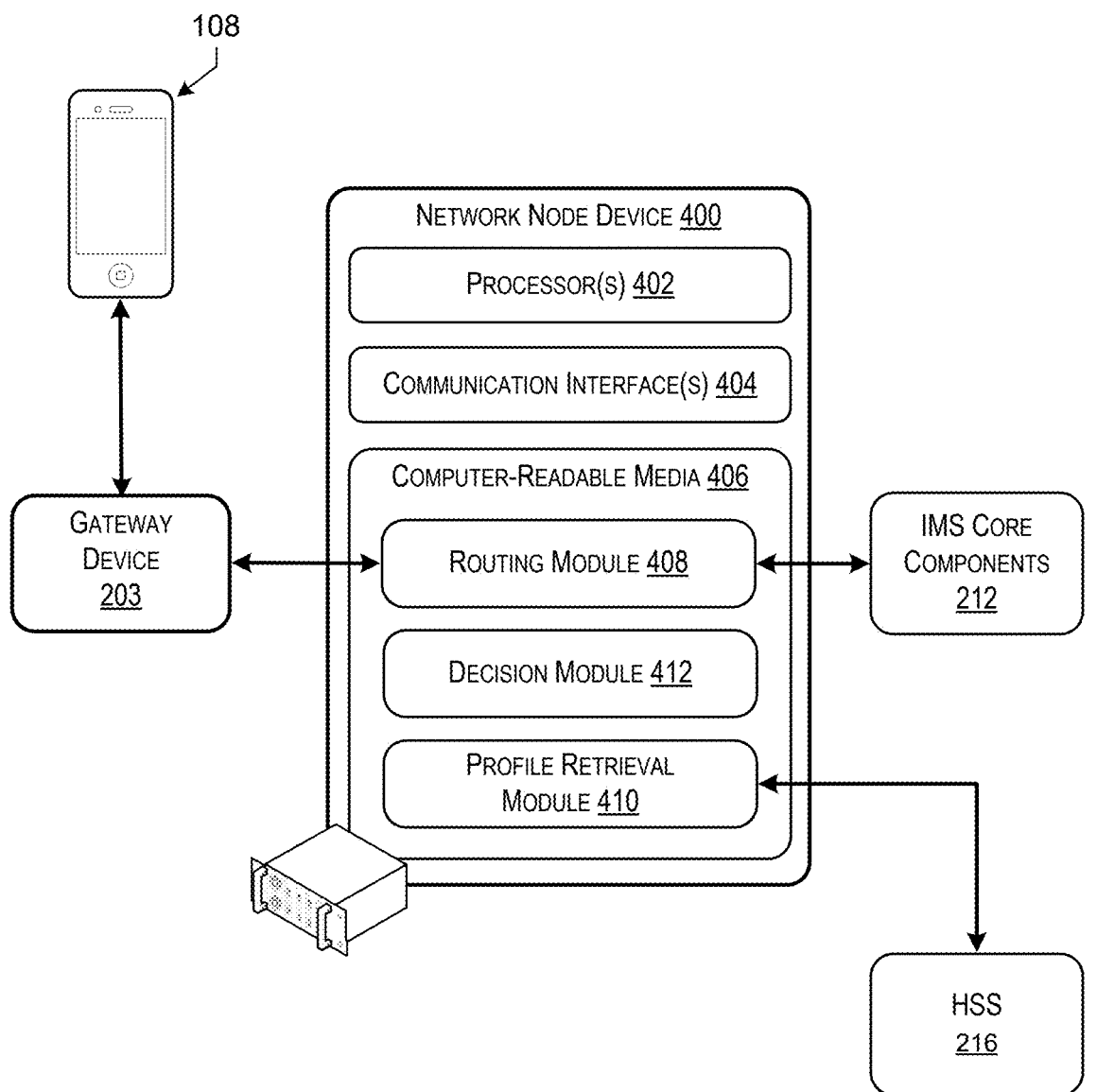
FIG. 4 depicts a component diagram of an example system to be implemented in a network in order to enable implementation of dynamic connection interval values in accordance with some embodiments.

FIG. 4 depicts a component diagram of an example system to be implemented in a network (e.g., an IMS network) in order to enable implementation of dynamic connection interval values in accordance with some embodiments. As depicted in FIG. 2, a network node (e.g., an IMS node operating on an IMS network) 400 may be in wireless communication with a UE 208 that is operated by a user. The connection between the UE 208 and the network node operating on a network may be made over a gateway device 203.

In some embodiments, a network node 400 may be an example of an IMS node (e.g., 210-214) as described in relation to FIG. 2 above. In some embodiments, the network node 400 is implemented in communication with a gateway device 203. Gateway device 203 may be an example of the gateway device as described in relation to FIG. 2 above. It should be noted that such an IMS node (or any other described computing component) may include a single computing device (e.g., a server device) or a combination of computing devices. In some cases, the IMS node may be implemented as a virtual device/system (e.g., via virtual machines implemented within a cloud computing environment).

As illustrated, the network node 400 may include one or more hardware processors 402 configured to execute one or more stored instructions. Such processor(s) 402 may comprise one or more processing cores. Further, the network node 400 may include one or more communication interfaces 404 configured to provide communications between the network node 400 and other devices, such as the UE 208 or any other suitable electronic device.

The network node 400 may also include computer-readable media 406 that stores various executable components (e.g., software-based components, firmware-based components, etc.). The computer-readable media 406 may store components to implement functionality described herein. While not illustrated, the computer-readable media 406 may store one or more operating systems utilized to control the operation of the one or more devices that comprise the network node 400. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 406 may include portions, or components, that configure the network node 400 to perform various operations described herein. For example, the computer-readable media 406 may include some combination of components configured to implement the described techniques. Particularly, the network node 400 may include a component configured to route received network traffic to an appropriate destination (e.g., routing module 408), a component configured to retrieve profile data related to a request for a UE (e.g., profile retrieval module 410), and/or a component configured to make routing decisions based on retrieved profile data (e.g., decision module 412). Additionally, the computer-readable media 406 may further maintain one or more databases. For example, the computer-readable media may include a data repository that stores profile data for one or more UEs on a temporary basis.

A routing module 408 may be configured to, when executed by the processors 402, provide routing and switching functionality in relation to network traffic. For example, where the IMS node is a P-CSCF node (e.g., P-CSCF node 110 of FIG. 1), then the routing module 408 may be configured to route messages between the UE 208 and one or more IMS core components 112 (e.g., a S-CSCF node) operating within the IMS network.

A profile retrieval module 410 may be configured to, when executed by the processors 402, retrieve profile data related to a UE. In embodiments, the network node 400 may maintain a direct connection between itself and a HSS 216. Upon receiving a communication related to a UE 208 (either directed to the UE 208 or originating at the UE 208), send a request to the HSS 216 for profile data to be used in making routing decisions. In some embodiments, the request may include information about the UE 208, such as an identifier unique to the UE, as well as information about the communication related to the UE 208. The network node 400 may then receive profile data that relates to the UE 208, which it may store on a temporary basis.

A decision module 412 may be configured to, when executed by the processors 402, make a determination about whether a communication related to the UE 208 should be relayed to a second device. Initially, the decision module 412 may, upon receiving a communication relating to the UE 208, retrieve profile data associated with that UE 208 from the HSS 216. To do so, the profile retrieval module 410 may be executed. In embodiments in which the network node 400 has received a communication from the UE 208 that is directed toward an applications server, the P-CSCF node may make a determination as to whether the service is, or should be made, available to the UE based on profile data associated with the UE that has been provided to the P-CSCF node by the HSS 216. In embodiments in which the network node 400 has received a communication from an applications server that is directed toward the UE 208, the P-CSCF node may make a determination as to whether the communication should be forwarded to the UE 208 based on profile data associated with the UE that has been provided to the P-CSCF node by the HSS 216.

Figure 5:
FIG. 5 depicts a swim lane diagram illustrating a first example of a process for providing improved routing for IMS services in accordance with some embodiments.
Figure 6:
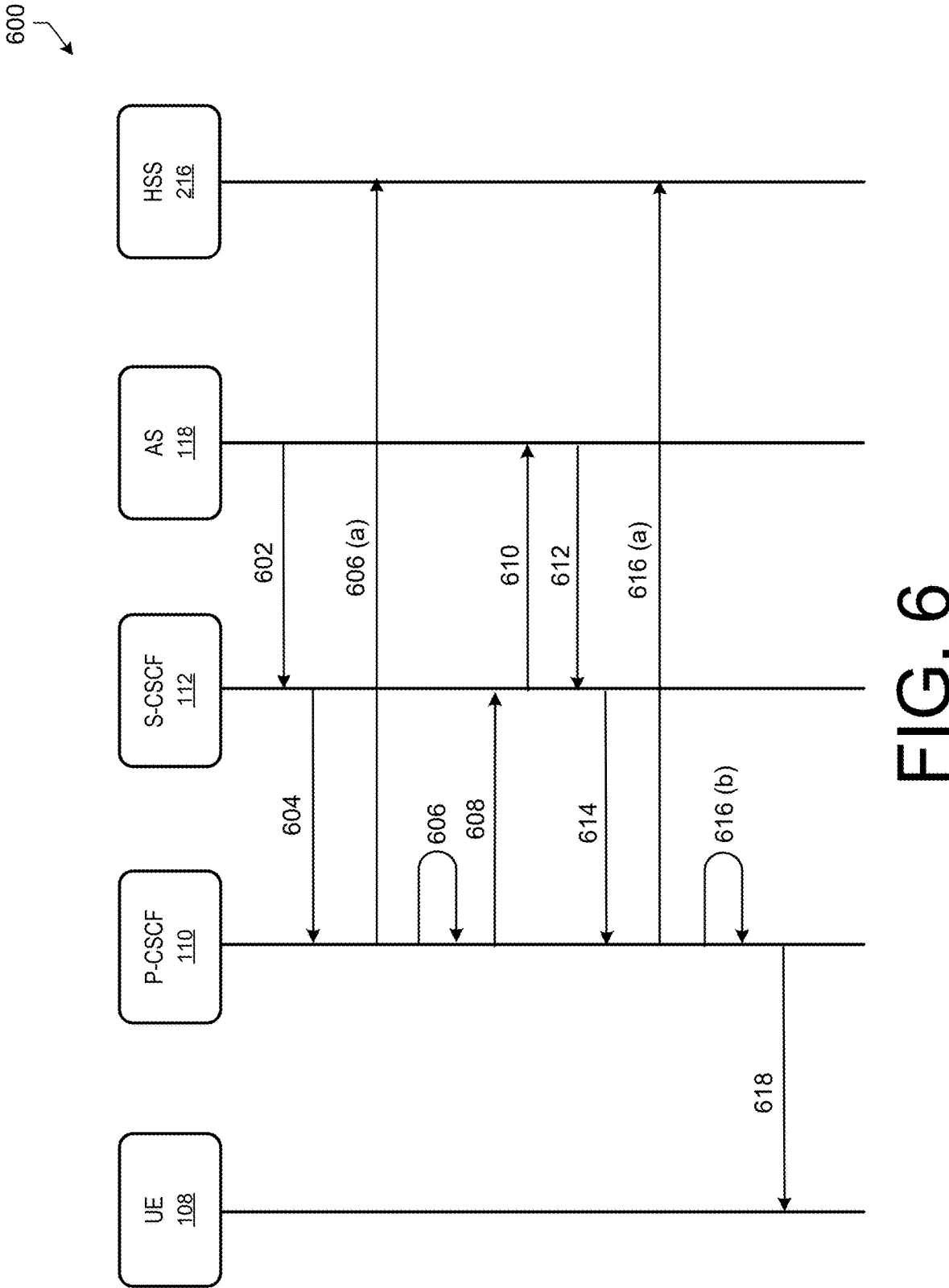
FIG. 6 depicts a swim lane diagram illustrating a second example of a process for providing improved routing for IMS services in accordance with some embodiments.
Figure 7:
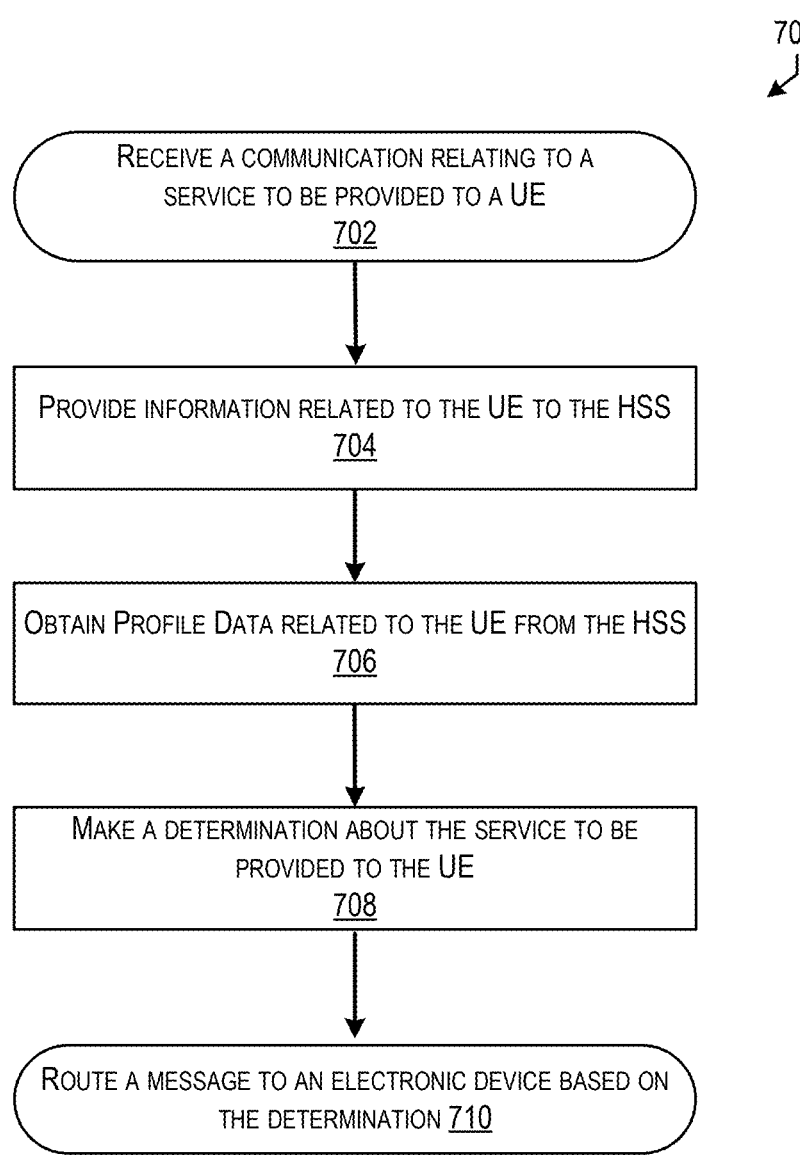
FIG. 7 depicts a flow chart illustrating an exemplary process for providing improved IMS service routing using information locally stored on the P-CSCF node in accordance with at least some embodiments.

FIGS. 5 through 7 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 depicts a swim lane diagram illustrating a first example of a process for providing improved routing for IMS services in accordance with some embodiments. The process 500 is depicted as a number of interactions between a UE 208 and various nodes of the IMS network, and more particularly, a P-CSCF node 110, a S-CSCF node 212, a AS 218, and a HSS 216. More particularly, this first example illustrates a process for providing improved IMS service routing for a UE that initiates a communication session (e.g., the UE is an originating UE).

At 502, the P-CSCF node 110 may receive a first SIP request from the UE 208 as part of a communication session established for the UE 208. For example, the SIP request can comprise a SIP message that uses the SIP INVITE method to establish the communication session. As such, the P-CSCF node 110 can receive a SIP request that uses the SIP INVITE method to originate a communication session (e.g., a voice communication session with another UE).

Upon receiving the SIP message, the P-CSCF node 110 may send a request to the HSS 216 for profile data relating the UE 208 at 504 (*a*). Such a request may include information that can be used to identify the UE 208 and/or an account associated with the UE 208. For example, the request may include a phone number associated with the UE 208 or a serial number. In some embodiments, the request may further include an indication of a service that the UE 208 has requested access to via the SIP message. In response, the P-CSCF node 110 may receive profile data from the HSS 216 that relates to the UE 208. In some embodiments, the profile data may be stored locally for a period of time.

The P-CSCF node 110 may then make a determination about an IMS service indicated in that SIP message at 504 (*b*). Such a determination may be made based at least partially upon information received in the profile data about the UE and/or an account associated with that UE.

In some embodiments, a determination about an IMS service may relate to whether the service can/should be provided to a user. Such a determination may involve deciding whether the UE is capable of supporting the service, such as whether the UE has the necessary hardware and/or software capable of executing the service. For example, if the IMS service requires a particular hardware component or software application, the P-CSCF node may be able to quickly determine whether the UE has it and subsequently whether the IMS service should be provided to the UE. By way of illustration, an IMS service that requires a particular CODEC will not be provided to a UE that does not have the ability to support its format.

In some cases, determinations about capabilities of a UE may be made based on an identifier for the UE. For example, an International Mobile Subscriber Identity (IMSI) of the UE (or alternatively an IMEI) may be used to determine a type or category of that UE. In such an example, a type of device for the UE can be determined based on the first 6 digits of the IMSI and the P-CSCF node may then determine whether the IMS service is available to that type of device. By way of illustration, a request for an IMS service that is provided to a particular type of Internet of Things (IoT) device may be rejected if the IMSI of the requesting device indicates that it is not that type of IoT device.

In some embodiments, a determination about an IMS service may relate to whether the service can be provided in a region/area associated with the UE. For example, the P-CSCF node may store information relating to a Mobile Country Code (MCC) and/or a Mobile Network Code (MNC) that identifies a country and network associated with the user. Note that the combination of MCC and MNC may sometimes be referred to as a Home Network Identifier (HNI). In this example, the requested IMS service may not be available in certain regions or on certain networks. In these embodiments, the request can be rejected before being sent on to the AS 218, resulting in quick request resolution.

In some embodiments, the determination about the IMS service may relate to whether, or how, a session restoration procedure should be performed in the event of a node (e.g., a S-CSCF node) failure. For example, the information about a service level agreement (SLA) for the user can be used when assigning a replacement S-CSCF node. Alternatively, information the SLA may be used to determine that the communication should fail open if there is a core outage.

In some cases, a determination may be made as to whether a quality of service (QOS) associated with the UE is being met. For example, an operator of the UE may subscribe to a particular level of service as outlined in an SLA. In this example, metrics obtained in relation to the IMS services provided to the UE over time may be stored and compared to information included in the SLA for the UE to determine whether QOS expectations are being met. In some cases, the P-CSCF node 110 may, upon making a determination that the QOS expectations are not being met, update configuration/routing settings associated with the UE in order to improve the IMS services being provided.

For the first SIP request, the P-CSCF node 110 may make a determination that the IMS service should not be provided to the UE 208 based on the information that it has received via the profile data. In such a case, the P-CSCF node 110 may provide a response to the SIP message at 506 in which the IMS service is declined. In some cases, such a response may include an error message or another negative indication. In some cases, upon receiving the response at 506, the UE 208 may end its current communication session. Note that the determination as to whether the IMS service should be provided is made absent any additional communication between the various nodes of the IMS network. This results in little to no bandwidth usage in relation to determinations about providing IMS services at the P-CSCF node 110, improving the responsiveness and efficiency of the IMS network as a whole.

At 508, the P-CSCF node 110 may receive a second SIP request from the UE 208 as part of the communication session established for the UE 208, which may also include a SIP request that uses the SIP INVITE method.

At 510 (a), the P-CSCF node 110 may either submit a second request to the HSS 216 for profile data or it may retrieve the previous profile data as stored locally. In some cases, the profile data may be retained locally by the P-CSCF node 110 in a data repository for a predetermined amount of time. In those cases, if the second SIP message is received within that predetermined amount of time from when the profile data was received (e.g., the profile data has not yet been purged from the local memory of the P-CSCF node 110), then the P-CSCF node 110 may retrieve the profile data from memory rather than submit a second request. In embodiments, the P-CSCF node 110 may submit a second request for profile data to the HSS 216 and may in turn receive second profile data in response.

Once more, the P-CSCF node 110 may make a determination at 510 (b) about whether the IMS service should be provided to the UE 208 based on the information that it has received in the profile data. For the second SIP request, the P-CSCF node 110 may make a determination that the IMS service should be provided to the UE 208. Upon making such a decision, the P-CSCF node 110 may relay the SIP message to the S-CSCF node 212 at 512. Upon receiving the SIP message, the S-CSCF node 212 may forward the SIP message to a AS 218 that is associated with the requested IMS service at 514.

Once the communication has been provided to the AS 218, the AS 218 can then forward the SIP request to a next hop (i.e., a next IMS node). In the case of a communication session with another UE, the SIP request can ultimately be forwarded as a SIP response to the other UE in order to allow the multiple UEs to communicate over the IMS core.

FIG. 6 depicts a swim lane diagram illustrating a second example of a process for providing improved routing for IMS services in accordance with some embodiments. Like the process 500 of FIG. 5, the process 600 is depicted as a number of interactions between a UE 208 and various nodes of the IMS network, and more particularly, a P-CSCF node 110, a S-CSCF node 212, a AS 218, and a HSS 216. More particularly, this second example illustrates a process for providing improved IMS service routing for a UE that is the target of a communication session (e.g., the UE is a terminating UE).

At 602, a AS 218 associated with an IMS service may determine that a communication related to that IMS service should be provided to the UE 208. For example, the AS 218 may provide UE to UE communication (e.g., VoIP communication) and may determine that a communication session is to be established between an originating UE and the UE 208.

The AS 218 may identify the S-CSCF node 212 as being assigned to the UE 208 based on information stored by the IMS network during a registration process. In such a case, the AS 218 may provide a first SIP request to the S-CSCF node 212 at 602. The S-CSCF node 212 may then forward the SIP request to the P-CSCF node 110 at 604.

Once the P-CSCF node 110 receives a first SIP request from the AS 218 in relation to an IMS service to be provided, it may send a request to the HSS 216 for profile data relating the UE 208 at 606 (a). Such a request may include information that can be used to identify the UE 208 and/or an account associated with the UE 208. For example, the request may include a phone number associated with the UE 208 or a serial number. In some embodiments, the request may further include an indication of a service that the UE 208 has requested access to via the SIP message. In response, the P-CSCF node 110 may receive profile data from the HSS 216 that relates to the UE 208. In some embodiments, the profile data may be stored locally for a period of time.

The P-CSCF node 110 may then make a determination as to whether to forward that SIP request to the UE 208 at 606 (b). This determination by the P-CSCF node may be similar in nature to the determination described above in relation to 504 of FIG. 5.

For the first SIP request, the P-CSCF node 110 may make a determination that the IMS service should not be provided to the UE 208 based on the information that it has stored in its local repository. In such a case, the P-CSCF node 110 may provide a response to the AS 218 in which the IMS service is declined. In some cases, such a response may include an error message or another negative indication. In such cases, the P-CSCF node 110 provides the rejection SIP response back to the S-CSCF node 212 at 608 which then forwards the SIP response back to the AS 218 at 610.

At a different time, the AS 218 may determine that a second communication related to that IMS service should be provided to the UE 208. In such a case, the AS 218 may once more identify the S-CSCF node 212 as being assigned to the UE 208. The AS 218 may then provide a second SIP request to the S-CSCF node 212 at 612. The S-CSCF node 212 then forwards the second SIP request to the P-CSCF node 110 at 614.

Once more, the P-CSCF node 110 may make a determination at 616 about whether the IMS service should be provided to the UE 208 based on the information that it has stored in its local repository. For the second SIP request, the P-CSCF node 110 may make a determination that the IMS service should be provided to the UE 208. Upon making such a decision, the P-CSCF node 110 may relay the SIP message to the UE 208 at 618. Upon receiving the SIP message, the UE 208 may establish a communication session with the AS 218 over the respective nodes in the IMS network.

FIG. 7 depicts a flow chart illustrating an exemplary process for providing improved IMS service routing using information locally stored on the P-CSCF node in accordance with at least some embodiments. In embodiments, the process 700 may be performed within an IMS network (e.g., by a P-CSCF node) in order to provide IMS services. The HSS may maintain user profile data that stores information about individual accounts associated with the IMS network.

At 702, the process 500 may involve receiving a communication relating to an IMS service to be provided to the UE. Such a communication may be a Session Initiation Protocol (SIP) request. In some embodiments, the communication relating to the service to be provided to the UE is received from an application server and is directed to the UE (e.g., the UE is a terminating device). In some embodiments, the communication relating to the service to be provided to the UE is received from the UE and is directed to an application server (e.g., the UE is an originating device).

At 704, the process 700 may involve providing information about the received communication to the HSS in a request for profile data. In some embodiments, the information provided to the HSS may include at least an identifier that can be used to identify the UE and/or an account associated with the UE. In some embodiments, the information may further include an indication of a type of the communication and/or an identifier for a service that relates to the communications.

At 706, the process 700 may involve obtaining information related to the UE from the HSS as profile data. In some embodiments, the profile data is provided by the HSS to the P-CSCF node via a communication session maintained between the P-CSCF node and the HSS. At 506, the process 500 may involve storing the obtained information in a local repository of the P-CSCF node on a temporary basis.

At 708, the process 700 may involve making a determination about the service related to the IMS service, the determination about the service to be provided to the UE may be made without any additional communication between the HSS and the P-CSCF node.

In some embodiments, the determination about the service to be provided to the UE is made based on one or more capabilities determined to be associated with the UE. For example, the information related to the UE may include at least a unique identifier for the UE, and the one or more capabilities may be determined to be associated with the UE based on the unique identifier. In this example, the unique identifier may be one of an International Mobile Subscriber Identity (IMSI) or an International Mobile Equipment Identifier (IMEI).

In some embodiments, the determination about the service to be provided to the UE is made based on a service level agreement (SLA) associated with an account for the UE. For example, the determination about the service to be provided to the UE may be made based on metrics obtained in relation to the service to be provided to the UE and quality of service (QOS) requirements indicated in the SLA. In this example, the QOS requirements may include an indication of one or more thresholds associated with the metrics obtained in relation to the service, such that a determination may be made as to whether one or more values associated with the metrics exceeds or falls below a respective threshold value.

In some embodiments, the determination about the service to be provided to the UE is made based on an availability of the service in a geographic region with which the UE is associated. For example, the determination may be a determination as to whether or not to provide the service in a region that the UE is currently located. In another example, certain services may not be available to residents of a particular region or area. In such cases, the determination may be a determination as to whether or not to provide a service to the UE based on a residency address associated with an account for the UE.

At 710, the process 700 may involve routing a message to an electronic device based on the determination. In some cases, the determination may be a determination to block the service the message is a rejection and the electronic device comprises a device from which the communication was received. In other cases, the determination is a determination to provide the service and routing the message to the electronic device is sending the communication to a next hop (e.g., the next device in a communication path) associated with the service.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Although the descriptions provided herein may be in the context of certain radio access technologies, networks, and network topologies, such as 5G/NR mobile communications, the proposed concepts, schemes, and any variations thereof may be implemented in, for and by other types of radio access technologies, networks, and network topologies. Such radio access technologies, networks, and network topologies may include, for example and without limitation, Long-Term Evolution (LTE), Internet-of-Things (IoT), Narrow Band Internet of Things (NB-IoT), vehicle-to-everything (V2X), fixed wireless internet, and non-terrestrial network (NTN) communications. Thus, the scope of the disclosure is not limited to the examples described herein.

What is claimed is:

1. A method comprising:

receiving, by a proxy call session control function (P-CSCF) node within an Internet Protocol Multimedia Subsystem (IMS) network, a communication relating to a service to be provided to a user equipment (UE);

providing, by the P-CSCF node to a Home Subscriber Server (HSS) in direct communication with the P-CSCF node, information related to the UE;

obtaining, by the P-CSCF node from a Home Subscriber Server (HSS), profile data related to the UE, wherein the profile is obtained without any additional communication between the P-CSCF node and other components of the IMS network;

making, by the P-CSCF node, a determination about the service to be provided to the UE based on the profile data related to the UE; and routing, by the P-CSCF node, a message to an electronic device based on the determination about the service to be provided.

2. The method of claim 1, wherein the P-CSCF node is assigned to the UE when the UE is registered with an IMS network that includes the P-CSCF node.

3. The method of claim 1, wherein the determination about the service to be provided to the UE is made based on one or more capabilities determined to be associated with the UE.

4. The method of claim 1, wherein the information related to the UE comprises at least a unique identifier for the UE.

5. The method of claim 4, wherein the unique identifier comprises one of an International Mobile Subscriber Identity (IMSI) or an International Mobile Equipment Identifier (IMEI).

6. The method of claim 1, wherein the determination about the service to be provided to the UE is made based on a service level agreement (SLA) associated with an account for the UE.

7. The method of claim 6, wherein the determination about the service to be provided to the UE is made based on metrics obtained in relation to the service to be provided to the UE and quality of service (QOS) requirements indicated in the SLA.

8. The method of claim 7, wherein the QOS requirements include an indication of one or more thresholds associated with the metrics obtained in relation to the service.

9. The method of claim 1, wherein the profile data related to the UE is provided by the HSS to the P-CSCF node via a communication session established between the HSS and the P-CSCF node.

10. A proxy call session control function (P-CSCF) node operating in an Internet Protocol Multimedia Subsystem (IMS) network comprising:

one or more processors; and one or more non-transitory computer-readable media storing computer-executable instructions that, when executed by the one or more processors, cause P-CSCF node to perform operations comprising:

receiving a communication relating to a service to be provided to a user equipment (UE);

providing, to a Home Subscriber Server (HSS) in direct communication with the P-CSCF node, information related to the UE;

obtaining, from a Home Subscriber Server (HSS), profile data related to the UE without any additional communication between the P-CSCF node and other components of the IMS network;

making a determination about the service to be provided to the UE based on the profile data related to the UE; and routing a message to an electronic device based on the determination about the service to be provided.

11. The P-CSCF node of claim 10, wherein the communication relating to the service to be provided to the UE is received from an application server and is directed to the UE.

12. The P-CSCF node of claim 10, wherein the communication relating to the service to be provided to the UE is received from the UE and is directed to an application server.

13. The P-CSCF node of claim 10, wherein the determination comprises a determination to block the service the message comprises a rejection and the electronic device comprises a device from which the communication was received.

14. The P-CSCF node of claim 10, wherein the determination comprises a determination to provide the service and routing the message to the electronic device comprises sending the communication to a next hop associated with the service.

15. The P-CSCF node of claim 10, wherein the determination about the service to be provided to the UE is made based on a service level agreement associated with the UE.

16. A system comprising:

a home subscriber server (HSS) configured to:

receive information related to a user equipment (UE) from a proxy call session control function (P-CSCF) node operating in an Internet Protocol Multimedia Subsystem (IMS) network;

generate profile data based on a user profile maintained in relation to the UE; and provide the profile data to the P-CSCF node; and the P-CSCF node in direct communication with the HSS, the P-CSCF node configured to:

receive a communication relating to a service to be provided to the UE;

provide, to the HSS, the information related to the UE;

receive the profile data from the HSS in response to providing the information, wherein the profile data is received without any additional communication between the P-CSCF node and other components of the IMS network; and make a determination about the service to be provided to the UE based on the profile data related to the UE.

17. The system of claim 16, wherein the communication comprises a Session Initiation Protocol (SIP) request.

18. The system of claim 16, wherein the P-CSCF node is assigned to the UE when the UE is registered on a network in which the P-CSCF node is operating.

* * * * *